Jan. 14, 1941.   H. F. TÖNNIES   2,228,424
ELECTRICAL MEASURING INSTRUMENT
Filed Sept. 26, 1938
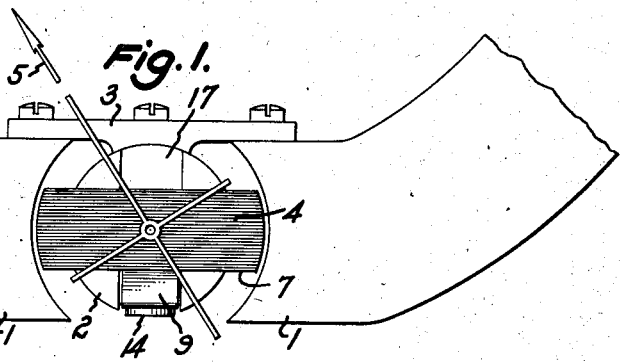
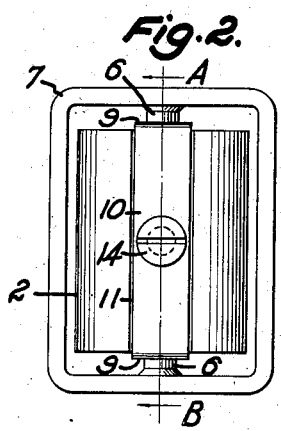
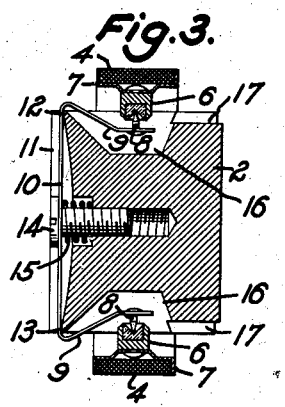
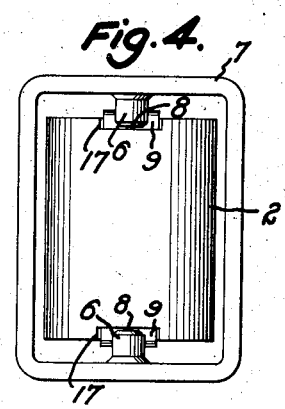
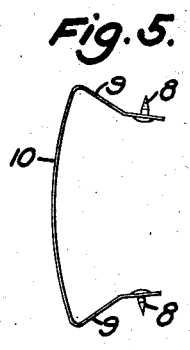
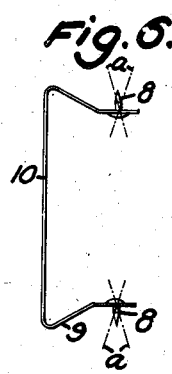
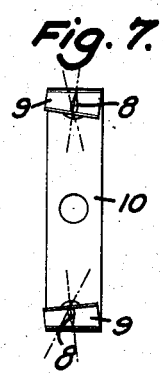
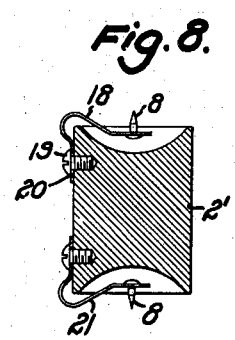
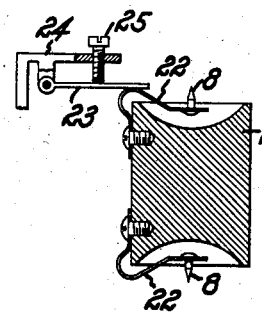
Inventor:
Hans Ferdinand Tönnies,
By Potter, Pierce & Scheffler
Attorneys.

Patented Jan. 14, 1941

2,228,424

UNITED STATES PATENT OFFICE 2,228,424

ELECTRICAL MEASURING INSTRUMENT

Hans Ferdinand Tönnies, Hamburg-Grossflottbek, Germany

Application September 26, 1938, Serial No. 231,813
In Germany October 16, 1937

11 Claims. (Cl. 171—95)

This invention relates to electrical measuring instruments and particularly to a resilient mounting for the pivoted coil of a galvanometer.

An object is to provide an electrical measuring instrument having a moving coil that is pivotally supported on resilient bearing members that may flex, under shock, to preclude damage to the instrument parts. An object is to provide an electrical instrument of the permanent magnet and moving coil type in which the bearings are secured to the coil and the pivots are carried by a spring, or springs, that are mounted on the core. An object is to provide instruments of the type stated in which the resilient mounting for the moving coil permits a ready replacement of the pivots if they are damaged by shocks and jars.

These and other objects and advantages of the invention will be apparent from the following specification when taken with the accompanying drawing in which Fig. 1 is a fragmentary plan view of an instrument embodying the invention, Fig. 2 is a side elevation of the coil and core assembly, Fig. 3 is a vertical section substantially on the center line AB of Fig. 2, Fig. 4 is a side elevation of the coil and core assembly as viewed at 180° from Fig. 2.

Fig. 5 is a side elevation of the spring mounting and pivots, as seen when removed from the assembly, Figs. 6 and 7 are diagrammatic views illustrating different flexings of the resilient mounting to absorb shocks, and Figs. 8 and 9 are central sections through core assemblies constituting other embodiments of the invention.

In the drawing, the reference numerals 1 identify the spaced polar extremities of a permanent magnet system between which the core 2 is supported by a bracket 3. A coil 4 is supported for pivotal movement about the axis of the core and carries a pointer 5 that is displaceable over a scale plate, not shown.

In accordance with this invention, the jewel bearings 6 for the coil are fixed to straps 7 that are cemented to the coil 4 to position the bearings within the coil. The steel pivot pins 8 are mounted at the ends of the arms 9 that extend from the central section 10 of a flat strip of resilient metal. As shown in Fig. 5, the resilient strip is of approximately C-shape, when unstressed, with the central section bowed away from the ends 9, thereby positioning the pivot pins 8 too close to each other and out of axial alinement.

The strip is seated in concave slot 11 in the edge of the core 2, Figs. 2 and 3, and the upper and lower edges 12, 13 respectively of the core engage the central section 10 of the strip closely adjacent its junctions with the arms 9. The arms 9 are inclined towards each other to bring the tips of the pivot pins 8 substantially at the upper and lower edges of the core. A screw 14 passes through section 10 and is threaded into the core to force the spring strip towards the core in opposition to the spring 15, thus separating the outer ends of the strip to move the pivot pins 8 into the bearings 6 with a desired pressure. The location of the pivot tips in line with the core edges 12, 13 precludes a transverse shifting of the pivots and coil with adjustments of the screw 14 to vary the bearing pressure.

The ends of the core 2 are recessed, as indicated at 16 to receive the spring arms 9, and have slots 17 that permit the coil 4 and its bearings 6 to be fitted over the core. The parts are assembled by slipping the spring into place and inserting the screw 14. The coil 4 is then slipped over the core from the opposite side and screw 14 is turned down to flex the spring section 10, thus moving the pivot pins 8 into the bearings 6.

The end arms of the resilient spring protect the coil and bearings against axial shocks and, as shown in Fig. 6, transverse shocks in the plane of the spring mount are absorbed by the flexing of the end arms to permit the pivot pins to move to positions indicated by the dotted lines a, Fig. 6. Shocks transverse to the spring mount are absorbed by torsional movements of the arms 9, as shown in Fig. 7.

The resilient mounting of the coil has the further advantage that the tips of the pivots 8 may be given a small radius of curvature, thus reducing frictional resistance and providing higher sensitivity as weaker spiral springs may be used.

The resilient mounting strip may be readily removed, when the bearings are damaged, by backing off the screw 14 and removing the spring strip. The coil 4 may be temporarily supported in normal position by a clamp or jig when the spring strip is to be replaced. If the bearings 6 are damaged, the coil may be removed and a new coil substituted when the screw 14 is backed off to permit the strip to assume its normal unflexed condition.

Other constructions that do not have the full advantages of the described arrangement are shown in Figs. 8 and 9. The cores 2' have concave recesses at each end but are not slotted to pass the coil bearings as the design is such that the tips of the pivot pins 8 lie beyond the core ends. In both modifications the pivot pins are carried by individual spring strips.

As shown in Fig. 8, the upper pivot 8 is mounted on a curved spring strip 18 that has an outer end lying along and secured to the core 2' by a screw 19. The strip 18 has a slot 20 that permits adjustment of the strip longitudinally of the core to vary the bearing pressure. The lower pivot pin 8 is carried by a spring strip 21 which could be similarly slotted for adjustment but which is preferably secured to the core in a predetermined position.

The Fig. 9 embodiment includes similar curved spring strips 22 carrying the pivots 8 and fixed in predetermined positions on the core. The bearing pressure is adjusted by a lever 23 that is pivoted to a fixed part 24 of the instrument and rests on the upper spring strip 22. The pressure exerted on the spring strip by the lever 23 is regulated by the screw 25.

The illustrated constructions locate the pivot pins on the resilient mounting strip and the jewel bearings on the coil. This arrangement could be reversed but the bearings are stronger and less subject to damage than the pivot pins and it is therefore preferable to place the pivot pins on the resilient strip. This facilitates repair of the instruments when they are damaged by shocks.

The constructions are particularly adapted for use in instruments that cannot be mounted in a fixed position, for example in instruments forming parts of exposure meters. A further advantage for such use arises from the fact that the location of the bearings within the coil results in a decrease in the thickness of the instrument.

I have described preferred embodiments of the invention but it is to be understood that there is some latitude in the design and relationship of the parts without departure from the spirit of my invention as set forth in the following claims.

I claim:

1. In an electrical measuring instrument, a permanent magnet, a core located between the ends of said magnet, a coil positioned about said core, a resilient strip of approximately C-shape mounted on said core with its opposite ends extending over and spaced from the ends of said core and co-operating sets of pivot pins and bearing members secured to said coil and to the ends of said resilient strip.

2. The invention as claimed in claim 1, wherein said resilient strip has an opening therethrough, in combination with a screw extending through said opening and threaded into said core, and a spring pressing said strip away from said core.

3. In an electrical measuring instrument, a permanent magnet and a core, a movable coil surrounding said core, said core having a longitudinal concave slot along one side, a resilient strip in said slot and bearing upon the upper and lower edges of said core, arms integral with said strip and extending over the ends of said core, bearing members carried by said arms and having surfaces located substantially in the planes of the respective ends of the core, and cooperating bearing members secured to said coil and engaging the bearing members of said arms.

4. The invention as claimed in claim 3, wherein the bearing members carried by said arms are pivot pins and the bearing members carried by said coil are jewels.

5. In an electrical measuring instrument, a permanent magnet and a core, a coil surrounding said core, and means mounting said coil for pivotal movement; said means including at each end of the core a resilient arm attached to the side of the core and having a free end extending between the adjacent core end and the coil, and cooperating bearing means carried respectively by the inner end surfaces of the coil and the free ends of said resilient arms.

6. The invention as claimed in claim 5, wherein said arms are integral with a central connecting strip of resilient metal.

7. The invention as claimed in claim 5, wherein said resilient arms are structurally independent of each other.

8. The invention as claimed in claim 5, wherein said resilient arms are structurally independent of each other, in combination with means adjustable to regulate the pressure under which the co-operating bearing members are engaged by said resilient arms.

9. In an electrical measuring instrument, a permanent magnet and core, a coil surrounding said core and carrying bearing members at the opposite ends thereof, spring arms secured to said core and carrying pivot pins engaging said bearing members to support said coil for pivotal movement and means for adjusting the pressure established between the bearing members of the coil and said cooperating bearing members by said spring arms.

10. The invention as claimed in claim 9, wherein separate spring arms are secured to each end of said core, and one of said arms includes a slot permitting adjustment of that arm longitudinally of said core.

11. The invention as claimed in claim 9, wherein separate spring arms are secured to each end of said core, in combination with means adjustable to flex one of said spring arms, thereby to vary the pressure under which said pivot pins engage said bearing members.

HANS FERDINAND TÖNNIES.